United States Patent
Yahagi

(10) Patent No.: US 6,442,176 B1
(45) Date of Patent: Aug. 27, 2002

(54) SIGNAL TRANSMISSION SYSTEM IN A MOBILE COMMUNICATION NETWORK

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/244,862

(22) Filed: Feb. 5, 1999

(30) Foreign Application Priority Data

Feb. 10, 1998 (JP) .......................................... 10-028632

(51) Int. Cl.⁷ .............................................. H04L 12/56
(52) U.S. Cl. ........................ 370/474; 370/465; 370/328
(58) Field of Search ................................. 370/328, 474, 370/465, 758, 466; 714/786, 787, 790, 788, 701, 752, 751, 761; 375/341; 455/560

(56) References Cited

U.S. PATENT DOCUMENTS

| 5,381,425 A | * | 1/1995 | Bitzer et al. ................. 714/793 |
| 5,406,585 A | * | 4/1995 | Rohani et al. ............... 375/341 |
| 5,608,738 A | | 3/1997 | Matsushita |
| 5,710,765 A | * | 1/1998 | Lee et al. ..................... 370/321 |
| 5,856,971 A | * | 1/1999 | Gitlin et al. ................. 370/335 |
| 5,881,053 A | | 3/1999 | Kimball ....................... 370/260 |
| 6,151,487 A | * | 11/2000 | Kim et al. .................... 455/134 |
| 6,216,107 B1 | * | 4/2001 | Rydbeck et al. ............ 704/500 |

FOREIGN PATENT DOCUMENTS

| EP | 0662778 A2 | 7/1995 |
| JP | 63-204937 | 8/1988 |
| JP | 3-55938 | 3/1991 |
| JP | 6-112892 | 4/1994 |
| JP | 7-131400 | 5/1995 |
| JP | 8-331644 | 12/1996 |
| JP | 9-18449 | 1/1997 |
| JP | 9-135275 | 5/1997 |
| JP | 9275405 | 10/1997 |

OTHER PUBLICATIONS

M. Miyagi et al., "Selective Repeat Type–II Hybrid FEC/ARQ Systems Using Concatenated Codes," Electronics and Communications in Japan, vol. 76, No. 6, Jun. 1993, pp. 25–34.

K. R. Narayanan, "Physical Layer Design for Packet Data over IS–136," IEEE Vehicular Technology Conference, vol. 47, May 1997, pp. 1029–1033.

by H. Nakamura et al., "Using ATM to carry very low bit–rate mobile voice signals", *1995 Fourth IEEE International Conference on Universal Personal Communications Record*, Nov. 1995, pp. 863–867.

* cited by examiner

*Primary Examiner*—Douglas Olms
*Assistant Examiner*—Ken Vanderpuye
(74) *Attorney, Agent, or Firm*—Young & Thompson

(57) ABSTRACT

The present invention provides a signal transmission system capable of assuring continuity and quality of signals in the mobile communication network even though data packet is lost in the transmission line. In a signal transmission side, a convolutional encoder for convolutionaly encoding digital data to be transmitted to signal codes having redundant codes for correction, a interleaving unit for replacing a location of each signal code output from the convolutional encoder, a packet generation unit for generating data packets, for signal transmission, from signal codes output from the interleaving unit; and in a signal reception side, a convolutional code decoder for convolutionaly decoding signal codes received from the signal transmission side, and reproducing signal codes corresponding to lost packets during transmission, and outputting original digital data.

24 Claims, 15 Drawing Sheets

Fig.5

INTERLEAVE MEMORY

| 1 | 2 | 3 | 4 | — | 10 |
|---|---|---|---|---|----|
| 11 | 12 | 13 | 14 | — | 20 |
| 21 | 22 | 23 | 24 | — | 30 |
| 31 | 32 | 33 | 34 | — | 40 |
| 41 | 42 | 43 | 44 | — | 50 |
| | | | | | |
| 91 | 92 | 93 | 94 | | 100 |

Fig.6

500 DIVIDED UNIT

| 1 | 11 | 21 | 31 | — |
|---|----|----|----|---|

510 DIVIDED UNIT

| 1 | 11 | 21 | 31 | — |
|---|----|----|----|---|

501 DIVIDED UNIT

| 2 | 12 | 22 | 32 | — |
|---|----|----|----|---|

511 DIVIDED UNIT

| 2 | 12 | 22 | 32 | — |
|---|----|----|----|---|

502 DIVIDED UNIT

| 3 | 13 | 23 | 33 | — |
|---|----|----|----|---|

512 DIVIDED UNIT

| 3 | 13 | 23 | 33 | — |
|---|----|----|----|---|

503 DIVIDED UNIT

| 4 | 14 | 24 | 34 | — |
|---|----|----|----|---|

513 DIVIDED UNIT

| 4 | 14 | 24 | 34 | — |
|---|----|----|----|---|

⋮

509 DIVIDED UNIT

| 10 | 20 | 30 | 40 | — |
|----|----|----|----|---|

519 DIVIDED UNIT

| 10 | 20 | 30 | 40 | — |
|----|----|----|----|---|

Fig.7

600  SIGNAL PACKET

| 601 D.U.I | 500 | 510 | 520 | ............ | 590 |

610  SIGNAL PACKET

| 611 D.U.I | 501 | 511 | 521 | ............ | 591 |

620  SIGNAL PACKET

| 621 D.U.I | 502 | 512 | 522 | ............ | 592 |

630  SIGNAL PACKET

| 631 D.U.I | 503 | 513 | 523 | ............ | 593 |

⋮

690  SIGNAL PACKET

| 691 D.U.I | 509 | 519 | 529 | ............ | 599 |

D.U.I : DIVIDED UNIT IDENTIFIER

Fig.9

DEINTERLEAVE MEMORY

| 1 | 2 | ✗3 | 4 | — | 10 |
|---|---|---|---|---|---|
| 11 | 12 | ✗13 | 14 | — | 20 |
| 21 | 22 | ✗23 | 24 | — | 30 |
| 31 | 32 | ✗33 | 34 | — | 40 |
| 41 | 42 | ✗43 | 44 | — | 50 |
| │ | │ | │ | │ | | |
| 91 | 92 | ✗93 | 94 | | 100 |

SIGNAL TRANSMISSION SYSTEM IN A MOBILE COMMUNICATION NETWORK

BACKGROUND OF THE INVENTION

1. Field of the Invention

The present invention relates to a signal transmission system in a mobile communication network. Specifically, it relates to the signal transmission method between a mobile terminal and a mobile switching center through a base station in a mobile communication network.

2. Description of the Related Art

As to the conventional technologies regarding the connection between a base station and a communication network in a mobile communication system, there is one disclosed in Japanese Patent Application Laid-open No. Hei-6-152601 (hereafter, referred to as Prior Art 1). In Prior Art 1, it is assumed that the connective configuration between base stations 200, 201 and 20n, and a loop-shaped network has been established, as shown in FIG. 15. The Prior Art 1 is configured in such a way that the base station receives signal in a voice packet form sent from a mobile terminal in its own radio zone and the signal is transmitted to a destination mobile terminal via the loop-shaped network. Moreover, according to the approach shown in Prior Art 1, the signal sent from the mobile terminal is supplied in a broadcast signal mode, to the network. Respective radio base stations connected to the network then take in the signal dependent upon the destination address attached to the signal.

As to the description of the conventional signal transmission between a base station and a mobile switching center, there is one titled "International Conference on Universal Personal Communication" (ICUPC 95; pp. 863–867; hereafter, referred to as Prior Art 2). In Prior Art 2, the disclosed system is that the signal transmission between the base station (BS) and the mobile switching center (MSC) is performed by the transmission line employing the ATM (Asynchronous Transfer Mode) transmission technology. In addition, according to Prior Art 2, the voice signals output from the mobile terminal are divided into individual cells, and then transmitted, as shown in FIG. 16.

However, the conventional technology of signal transmission between the base station and the mobile switching center in the mobile communication system including the above Prior Arts 1 and 2, is faced with the following problems.

First, in the conventional technologies, when a signal transmission system between the base station and the mobile switching center is the system employing an intermittent transmission approach such a packet transmission, the ATM cell transmission or a frame relay transmission, it may occur discarding of data, or lost of data in a certain condition such as occurrence of congestion along the transmission line. This causes a problem that the original signal cannot be reproduced, or required signal may not be able to arrive by a predetermined time, and maintaining the continuity of signals cannot be guaranteed.

For example, if communication form of the mobile terminal is the voice, the fact that the continuity is not guaranteed indicates that users who are receiving may be able to sense the discontinuity of the voice.

Furthermore, since the voice is quite a real-time signal irrelevant of the bit-rate, even though signals of the discarded data is re-transmitted, the process cannot keep up with the speed.

Moreover, as the methods for correcting an intermittent voice, methods of muting a reproduced voice or repeating the voice frame just before are well-known.

However, neither of the methods can essentially solve the above problems.

Secondly, as long as there is the possibility of data loss or data discarding in the conventional technology and any means to solve the problem is not prepared, it cannot guarantee to maintain the quality of signals transmitted.

Moreover, if the communication form of the mobile terminal is data communication such as a facsimile, which uses multiple data, non-received signal data can be obtained by re-transmission the request of the receiving end. However, the re-transmission results in imposing an excess load on the transmission line. Thereby, another problem occurs wherein limited resources cannot be effectively utilized.

SUMMARY OF THE INVENTION

Accordingly, the object of the present invention is to solve the problems with the conventional technologies as described above, and provides a signal transmission system capable of assuring continuity and quality of signals in the mobile communication network even though data packet is lost in the transmission system employing an intermittent transmission approach such as packet transmission, ATM cell transmission or frame relay transmission.

A signal transmission system according to the present invention is for a mobile communication network in which a base station is connected to a mobile switching center through a transmission line and a signal form transmitted between the base station and the mobile switching center is a data packet form. The signal transmission system according to the present invention comprises the following elements.

The base station includes;
- a plurality of convolutional encoders, each for convolutionaly encoding digital data from a mobile terminal to signal codes having redundant codes for correction;
- a plurality of interleaving units, each for replacing a location of each signal code encoded by the corresponding convolutional encoder; and
- a packet generation unit for generating data packets from signal codes output from each of the interleaving units for transmitting to the mobile switching center through the transmission line.

The mobile switching center includes;
- a plurality of convolutional code decoders, each for convolutionaly decoding signal codes transmitted from the base station, and reproducing signal codes corresponding to lost packets during transmission, and outputting original digital data for switching.

Above elements are for upward direction signals, therefore, the following elements are also provided for the downward direction signals.

The mobile switching center includes;
- a plurality of convolutional encoders, each for convolutionaly encoding digital data output from a switching unit to signal codes having redundant codes for correction;
- a plurality of interleaving units, each for replacing a location of each signal code encoded by the corresponding convolutional encoder; and
- a packet generation unit for generating data packets from signal codes output from each of the interleaving units for transmitting to the base station through the transmission line.

The base station includes;
a plurality of convolutional code decoders, each for convolutionaly decoding signal codes transmitted from the mobile switching center, and reproducing signal codes corresponding to lost packets during transmission, and outputting original digital data for transmitting to the mobile terminal.

There are several variations of the present invention, and in one of them, the base station further comprises a plurality of punctured code generation units, each for reducing number of signal codes output from corresponding convolutional encoder, and outputting reduced number of signal codes to corresponding interleaving unit, and the mobile switching center further comprising a plurality of punctured code decoders, each for restoring reduced number of signal codes received from the base station to original number of signal codes, and outputting the restored number of signal codes to corresponding convolutional code decoder.

When considering the opposite signal direction, the following variation is also available;

The mobile switching center further comprising a plurality of punctured code generation units, each for reducing number of signal codes output from corresponding convolutional encoder, and outputting reduced number of signal codes to corresponding interleaving unit, and the base station further comprising a plurality of punctured code decoders, each for restoring reduced number of signal codes received from the mobile switching center to original number of signal codes, and outputting the restored number of signal codes to corresponding convolutional code decoder.

Other variation of the present invention is as follows;
a plurality of mobile terminals, each including a convolutional encoder for convolutionaly encoding digital data to signal codes having redundant codes for correction;
the base station includes;
a plurality of interleaving units, each for replacing a location of each signal code received form corresponding mobile terminal; and
a packet generation unit for generating data packets from signal codes output from each of the interleaving units for transmitting to the mobile switching center through the transmission line; and
the mobile switching center includes;
a plurality of convolutional code decoders, each for convolutionaly decoding signal codes transmitted from the base station, and reproducing signal codes corresponding to lost packets during transmission, and outputting original digital data for switching.

Configuration considering the opposite signal direction of the above case is also available.

AS for a method of signal transmission according to the present invention, the method comprises steps of:
in a signal transmission side;
convolutionaly encoding digital data to be transmitted to signal codes having redundant codes for correction;
replacing a location of each signal code having been convolutionaly encoded;
generating data packets, for signal transmission, from signal codes having been replaced each location of convolutionaly encoded signal codes; and
in a signal reception side;
convolutionaly decoding signal codes received from the signal transmission side, and reproducing signal codes corresponding to lost packets during transmission, and outputting original digital data.

BRIEF DESCRIPTION OF THE DRAWINGS

FIG. 5 is a block diagram showing the configuration of an interleave memory prepared in an interleaving unit and the locations of codes.

FIG. 6 is an illustration showing codes involved in each divided unit.

FIG. 7 is an illustration showing the arrangement and configuration of divided units for each signal packet.

FIG. 8(A) is an illustration showing an order of signal packets flowing in the transmission line.

FIG. 9 is an illustration showing effective codes when a divided unit is destroyed as shown in FIG. 8(C).

DETAILED DESCRIPTION OF PREFERRED EMBODIMENTS

A signal transmission system in a mobile communication network according to an embodiment of the present invention will be explained hereafter with reference to drawings.

Figure 1:
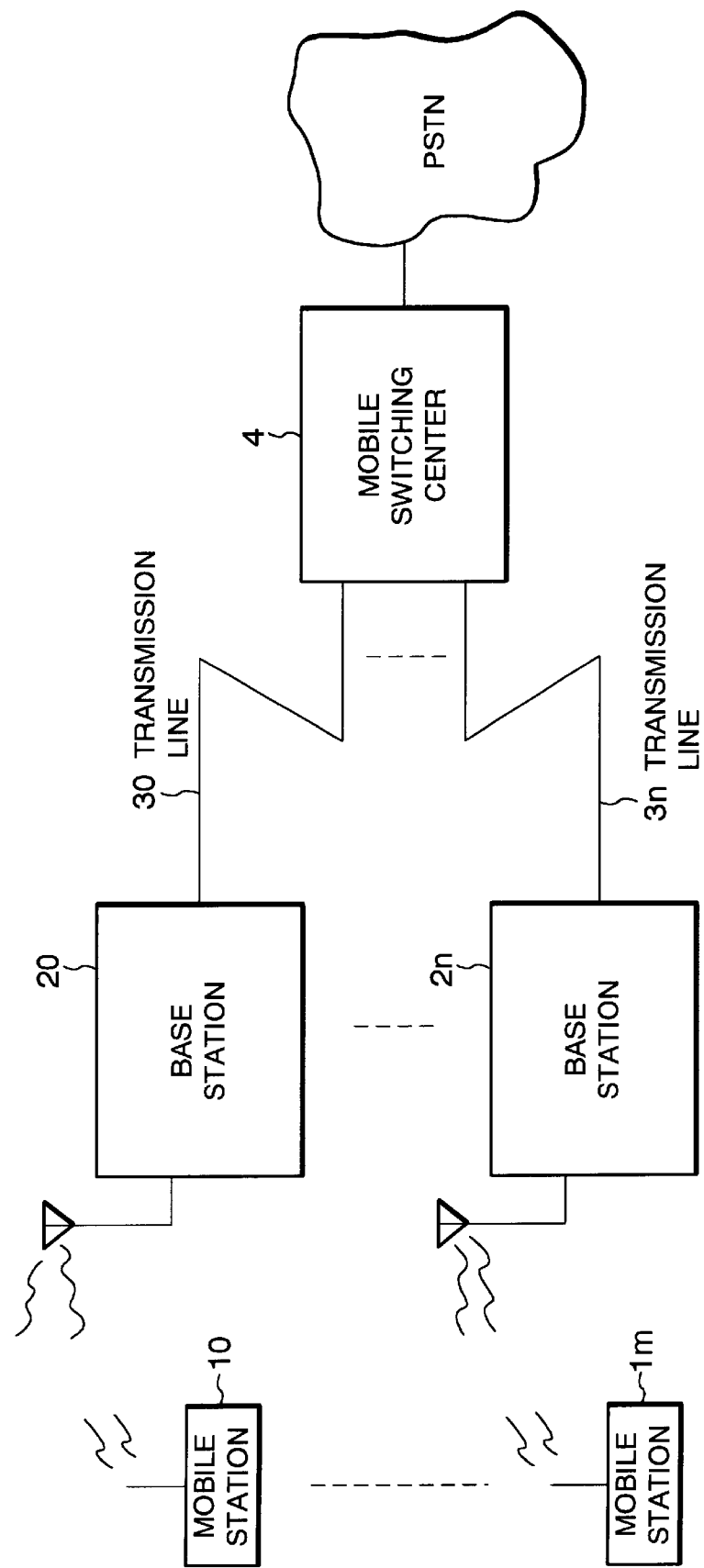
FIG. 1 is a block diagram showing the whole configuration of a mobile communication network in which the present invention is applied.

FIG. 1 is a block diagram showing the whole configuration of a mobile communication network in which the present invention is applied. The mobile communication network comprises a plurality of base stations 30–3n, each of which performs radio communication with a plurality of mobile terminals 10–1m locating in its radio zone, and at least one mobile switching center connected with the base stations by transmission lines 30–3n. The mobile switching center performs a call switching operation for mobile terminals, and various control signals are transmitted between mobile terminals and the mobile switching center via the base station.

1. A First Embodiment

In the description that follows, at first, the configuration and operation in terms of the signals transmitted from the base station 20 to the mobile switching center 4 of the first embodiment will be explained. The configuration and operation in terms of the signals transmitted from the mobile switching center 4 to the base station 20 will then also be explained.

(The configuration in terms of the signals transmitted from the base station 20 to the mobile switching center 4)

Figure 2:
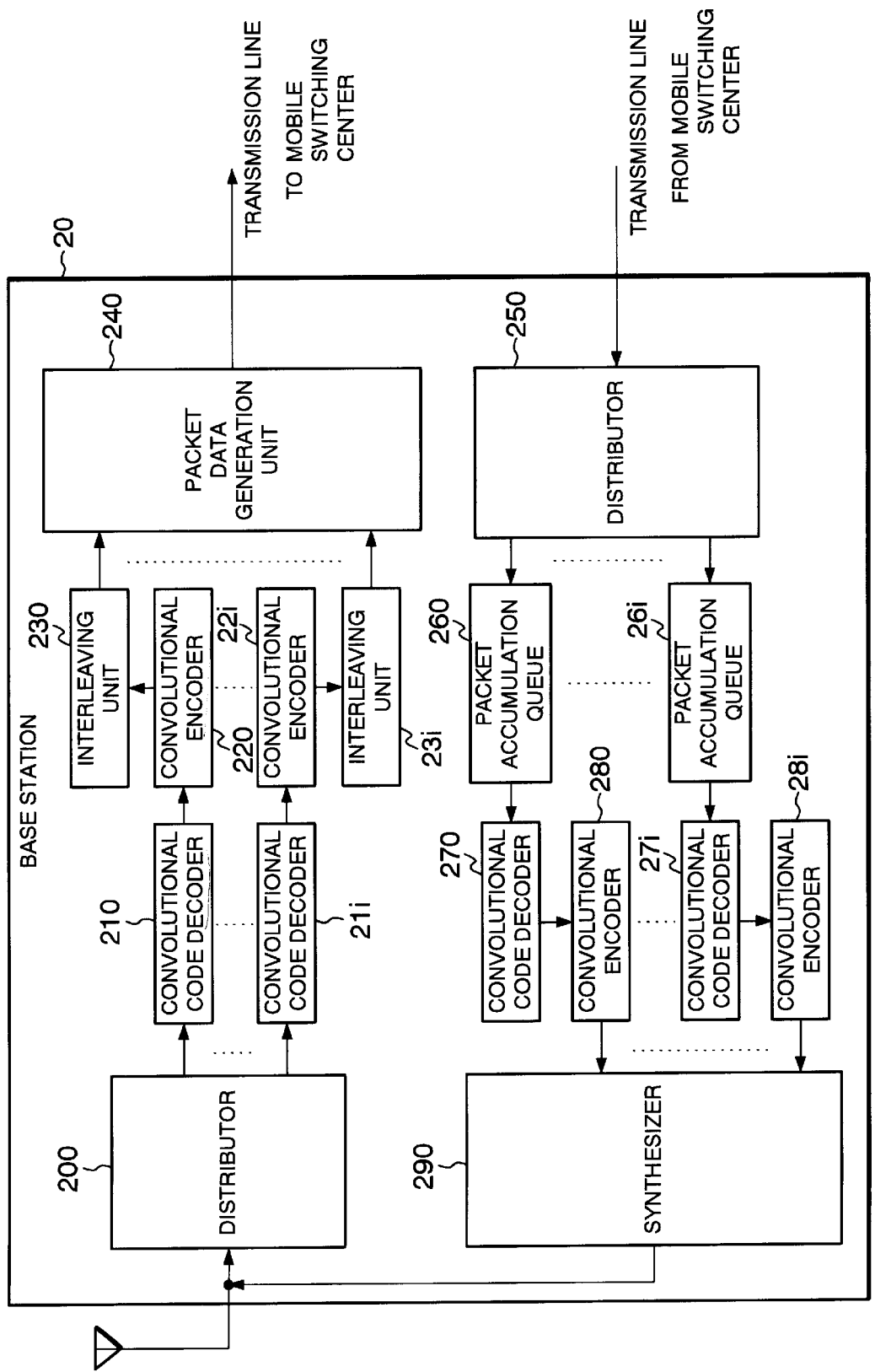
FIG. 2 is a block diagram showing the configuration relevant to the base station according to the first embodiment of the present invention.

FIG. 2 is a block diagram showing the configuration relevant to the base station 20 according to the first embodiment of the present invention.

As shown in FIG. 2, for signal transmission from the base station to the mobile switching center, the base station 20 is comprised of a distributor 200, convolutional code decoders 210 to 21$i$, convolutional encoders 220 to 22$i$, interleaving units 230 to 23$i$, and a packet data generation unit 240.

The distributor 200 is used to distribute a signal for each mobile terminal. The convolutional code decoders 210 to 21$i$ are used to decode the convolutionaly encoded signals for each corresponding mobile terminal. To increase corrective capability for signal packets transmitted from the base station 20 to the mobile switching center 4, the convolutional encoders 220 to 22$i$ encode the signals transmitted from corresponding-mobile terminals, again for signal transmission to the mobile switching center 4 through transmission line. The interleaving units 230 to 23$i$ divide the codes generated by respective convolutional encoders 220 to 22$i$ into a number of divided pieces, rearranging their order, so that they can be dispersively distributed into different signal packets. The packet data generation unit 240 is used to generate signal packets dependent upon the re-sorted codes obtained by the interleaving units 230 to 23$i$.

Figure 3:
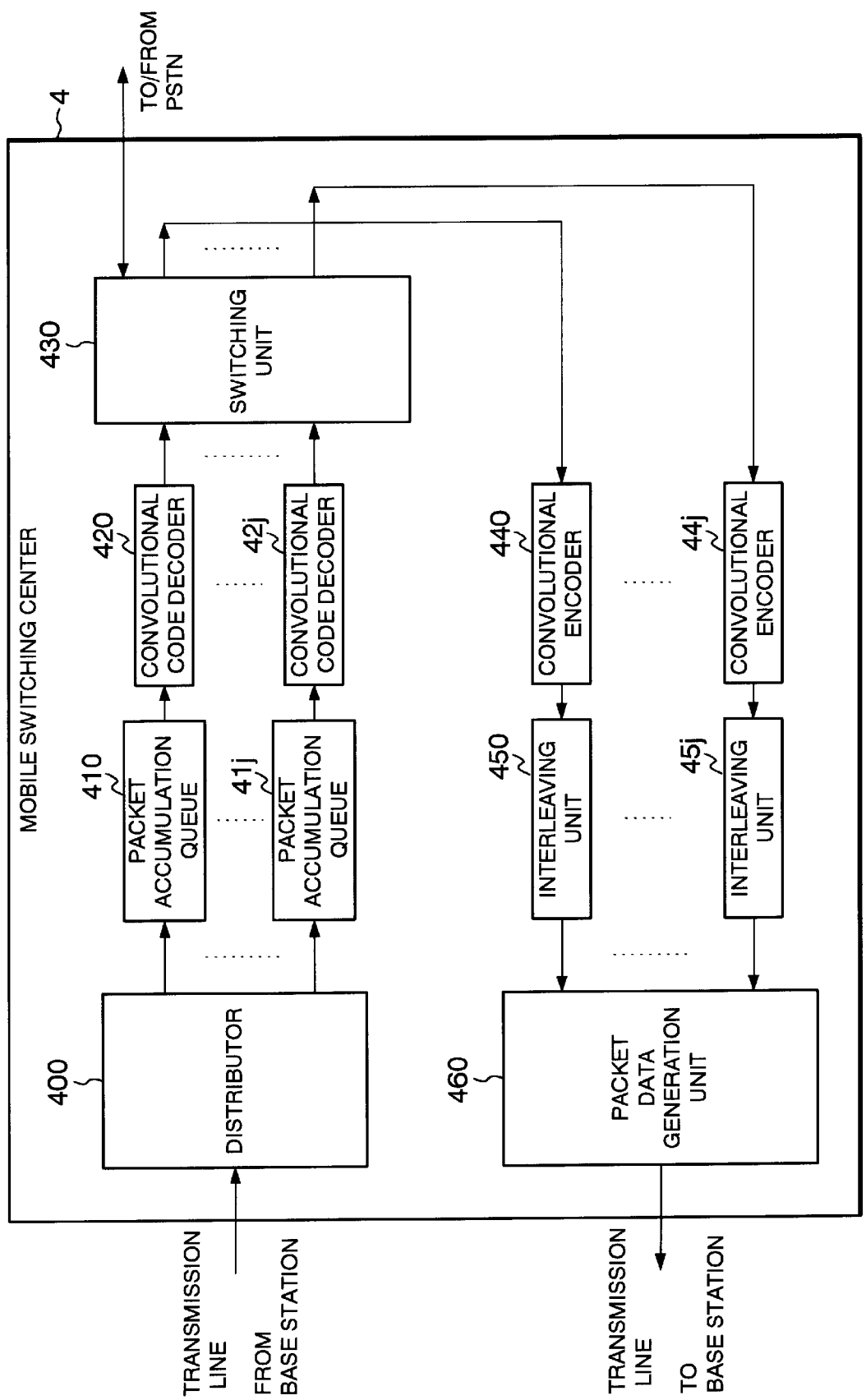
FIG. 3 is a block diagram showing the configuration relevant to the mobile switching center according to the first embodiment of the present invention.

FIG. 3 is a block diagram showing the configuration relevant to the mobile switching center according to the first embodiment of the present invention.

As shown in FIG. 3, for the signal transmitted from the base station, the mobile switching center 4 of the first embodiment is comprised of a distributor 400, packet accumulation queues 410 to 41$j$, and convolutional code decoders 420 to 42$j$. In the mobile switching center, the signal transmitted form the mobile terminal through the base station is switched by the switching unit 430, and transmitted to the PSTN or to the mobile terminal through the base station which will be described later.

The distributor 400 is used to distribute individual signal codes for each mobile terminal involved in the signal packets sent from the base station, to the packet accumulation queues 410 to 41$j$ corresponding to the respective mobile terminals. The packet accumulation queues 410 to 41$j$ are used to accumulate the signal codes of corresponding mobile terminals, which have been extracted from a number of signal packets by the distributor 400. The convolutional code decoders 420 to 42$j$ are used to decode the codes of respective mobile terminals transmitted from the base station.

(The configuration relevant to signals transmitted from the mobile switching center 4 to the base station 20)

As shown in FIG. 3, for the signal having been switched by the switching unit 430, the mobile switching center 4 is comprised of convolutional encoders 440 to 44$j$, interleaving units 450 to 45$j$, and packet data generation unit 460.

To enhance the reproductive capability for signal packets transmitted from the mobile switching center 4 to the base station 20, the convolutional encoders 440 to 44$j$, corresponding to the above-mentioned respective mobile terminals, convolutionaly encode. The interleaving units 450 to 45$j$ divide the codes generated by respective convolutional encoders 440 to 44$j$ into a number of divided pieces, rearranging their order, so that they can be dispersively distributed into different signal packets. The packet data generation unit 460 is used to generate signal packets dependent upon the re-sorted codes obtained by the interleaving units 450 to 45$j$.

On the other hand, as shown in FIG. 2 again, for the signal transmitted from the mobile switching center, the base station 20 is comprised of a distributor 250, packet accumulation queues 260 to 26$i$, convolutional code decoders 270 to 27$i$, convolutional encoders 280 to 28$i$, and a synthesizer 290.

The distributor 250 is used to distribute individual mobile terminal signal codes involved in the signal packets sent from the mobile switching center 4, to the packet accumulation queues 260 to 26$i$ corresponding to the respective mobile terminals. The packet accumulation queues 260 to 26$i$ are used to accumulate the signal codes extracted from a number of signal packets by the distributor 250. The convolutional code decoders 270 to 27$i$ are used to decode the signal codes transmitted from the mobile switching center 4. The convolutional encoders 280 to 28$i$ are used to encode the decoded signals obtained by the convolutional encoders 270 to 27$i$, in order to transmit them to corresponding mobile terminals. The synthesizer 290 is used to synthesize the signal codes encoded by the convolutional encoders 280 to 28$i$ for transmitting from the base station 20.

The operation of the first embodiment with the above-mentioned configuration will be explained with reference to the previously referred figures and FIGS. 4 to 9 as well. It is noted that in the description that follows, to explain in detail the form changes of the signals transmitted from a mobile terminal, the configuration of the mobile terminal will be explained, taken in conjunction with FIG. 4.

Figure 4:
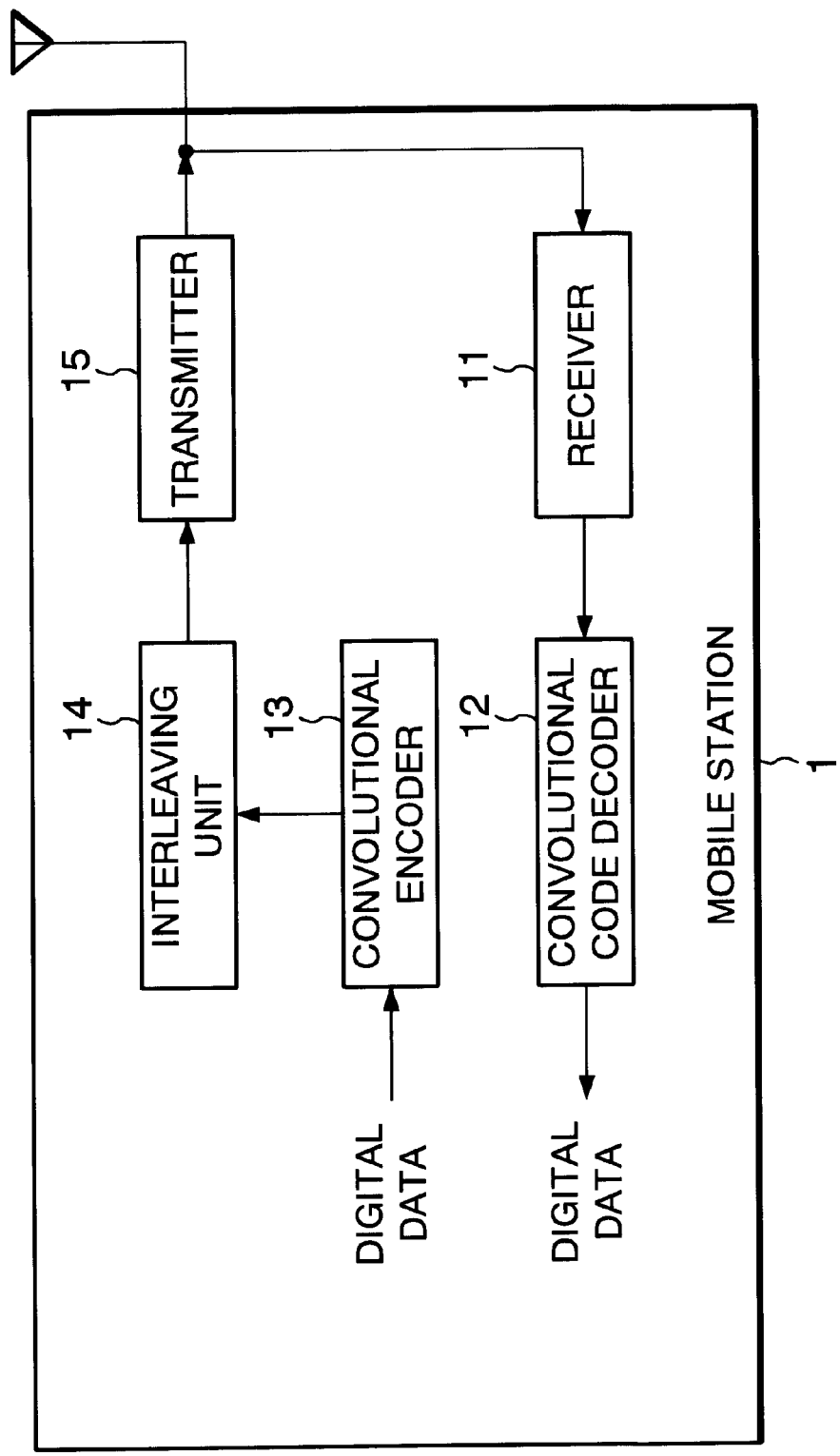
FIG. 4 is a block diagram showing the configuration of the mobile terminal according to the first embodiment.

The mobile terminals 10 to 1$m$ are each comprised of internal units as shown in FIG. 4.

The mobile terminal 1 is comprised of a convolutional encoder 13, an interleaving unit 14, and a transmitter 15 for signal transmission, and for signal reception, it comprises receiver 11 and convolutional code decoder 12.

In order to avoid the possibility that noises, which could be superimposed within the radio transmission section between the mobile terminal and the base station, makes it difficult to reproduce the signals at the receiving end, the convolutional encoder 13 convolutionaly encodes the signals so that they. are allowed to have a redundancy. (Therefore, the convolutional code decoder 12 is provided for signal reception from the base station in which the signals have been convolutionaly encoded.) The interleaving unit 14 is used to rearrange the locations of the signal codes generated by the convolutional encoder 13. The transmitter 15 is used to transmit the signal codes, which have been re-sorted by the interleaving unit, to the base station 20.

In the description that follows, for the convenience of explanation, it is assumed that convolutional code decoder 210, Convolutional encoder 220, and Interleaving unit 230 in the base station 20 correspond to the mobile terminal 10. And also, it is assumed that the mobile terminal 10 corresponds to packet accumulation queue 410 and convolutional code decoder 420 in the mobile switching center 4. It is also assumed that the contents of communication (both of voice and data) are to be converted into digital data.

Under the above assumption, the digital data will be processed in the following manner, and transmitted to the base station 20.

When the mobile terminal transmits a signal to the base station, noises may be superimposed on the transmitted signal at the radio transmission section, and such noises cause an interference to the transmitted signal. Even in this case, in order for the signal receiving side (the base station or the mobile switching center) to be able to normally reproduce signals, a means for giving a redundancy to the transmitted signal is to be provided. For this purpose, the convolutional encoder convolutionaly encodes the signal, and the location of the encoded signal is changed by the interleaving unit while taking into account the noise characteristics such as burst error characteristics at the radio transmission section. The transmitter then transmits the signal to the base station.

On the other hand, receiving the signal from the mobile terminal, the base station processes it in the following manner.

First, the distributor 200 distributes signal codes corresponding to the mobile terminal, in the received signals, to the apparatus corresponding to the mobile terminal; specifically to the convolutional code decoder 210. The convolutional code decoder 210 corrects a possible signal code error caused by possible noises superimposed at the radio transmission section between the mobile terminal and the base station, and decodes into original digital data.

In the next, when considering signal transmission between the base station and the mobile switching center through the transmission line, as to the decoded digital data, a part of the signal packets may be discarded or lost caused by a temporary congestion in the transmission line. This may happen as described in the consideration for solving problems with the prior arts.

Therefore, in the first embodiment of the present invention, in order for the mobile switching center able to reproduce digital data transmitted from the base station, the following countermeasures are provided.

Specifically, digital data decoded by the convolutional code decoder 210 is encoded by the convolutional encoder 220, again in the base station for signal transmission to the mobile switching center. Thereafter, the interleaving unit 230 rearranges the order of the resulting data.

The convolutional encoder 220 gives the decoded digital data a redundancy by convolutional encoding again, in order to avoid the possibility that the mobile switching center cannot reproduce the signal relevant to the mobile terminal when certain packets are discarded or lost in the transmission line between the base station and the mobile switching center. Then, the interleaving unit 230 rearranges the order of codes involved in the data in order to ensure that mobile switching center can reproduce them. It is noted that the specific operation and its results of the interleaving unit will be described later with reference to another figure.

In the above-mentioned manner, the signal packets of the mobile terminals are collected to enter the packet data generation unit 240 in the base station. The packet data generation unit 240 divides the signal data of respective mobile terminals into a number of signal packets, and transmits them to the mobile switching center via the transmission line.

With referring to FIG. 3, in the mobile switching center 4, the signal packets transmitted from the base station are distributed to apparatus corresponding to the respective mobile terminals by the distributor 400.

The distributor 400 extracts signal codes corresponding to the respective mobile terminals, from the incoming signal packets, and transmits them to the respective packet accumulation queues. The packet accumulation queue 410 accumulates the signal codes corresponding to the mobile terminal 10, and thereafter transmits several received codes corresponding to mobile terminal 10, to the convolutional code decoder 420. The convolutional code decoder 420 receives the codes from the packet accumulation queue 410, corrects a possible code deficit caused by the fact that a signal packet is discarded or lost in the transmission line between the base station and the mobile switching center, and decodes the resulting data into original digital data.

Next, the specific operation and its results of the interleaving unit in the base station will be explained with reference to FIG. 5.

First, with reference to FIG. 5, the structure of the interleave memory of the interleaving unit will be explained. The interleaving unit stores the signal codes encoded (generated) by the convolutional encoder in the interleave memory. The convolutional encoder encodes in order to be able to reproduce signals where a corresponding signal packet has been discarded or lost at the transmission section between the base station and the mobile switching center. To further ensure this, the interleaving unit performs replacement of location of signal codes in such a manner as described below. It is noted that the signal codes stored in the interleave memory are shown in FIG. 5.

It is assumed that the signal codes encoded by the convolutional encoder are generated in the order of code 1, code 2, code 3, . . . . Wherein, neighboring codes, for example, code 1 and code 2 are ones generated based upon multiple identical information bits or multiple neighboring information bits. Therefore, if a signal packet is discarded or lost when the neighboring codes are included in the same signal packet, the information bit corresponding to the signal code section, specifically the information bit included in both the signal codes is impossible to be reproduced. To avoid such a case where reproduction is impossible, according to the embodiment, the neighboring codes generated in the aforementioned manner are each put in different signal packets, and transmitted. More specifically, the codes 1 to 100 generated by the convolutional encoder are stored in the interleave memory in the order of code 1, code 2, code 3, . . . , code 100. On the other hand, they are read out in the order of code 1, code 11, code 21, . . . In this manner, the neighboring codes generated by rearranging the order of codes, can be put in different signal packets, respectively, and transmitted. In summary, the locations of signal codes are replaced.

The signal codes relevant to the mobile terminal 10, generated by the convolutional encoder 220 and replaced by the interleaving unit 230, enter the packet generation unit 240. In a similar manner, the codes relevant to the other mobile terminals, generated by the convolutional encoders –23$i$ and replaced by the interleaving units –23$i$, enter the packet generation unit 240.

The packet data generation unit 240 receives the signal codes, dividing them into preferable divided units as shown in FIG. 6.

For example, the signal codes relevant to the mobile terminal 10 are divided and accumulated in divided units 500 to 509, as shown in FIG. 6. Specifically, signal codes are distributed and accumulated in the order of code 1, code 21, code 31, . . . with their first digits being 1 in the divided unit 500. In a similar manner, signal codes are distributed and accumulated in the order of code 2, code 12, code 22, code 32, . . . with the first digits being 2 in the divided unit 501. Moreover, signal codes are distributed and accumulated in turn with groups of the first digits being 3 to 0 in the divided units 502 to 509, respectively. Thereby, neighboring codes, specifically the convolutional encoded codes, both including an identical information bit, cannot be put in the divided units 500 to 509, as described above.

In a similar manner, signals of the mobile terminal 11 are distributed to the divided units 510 to 519; signals of the mobile terminal 12 are distributed to the divided units 520 to 529; and signals of the mobile terminal 1*m* are distributed to the divided units 5*m*0 to 5*m*9.

Next, the divided units are all arranged in each signal packet, as shown in FIG. 7.

Specifically, a signal packet 600 includes: a divided unit identifier 601; the divided unit 500 relevant to the mobile terminal 10; and the divided units 510 to 590 in the order written, wherein 510 and 590 are relevant to the mobile terminal 11 and 19, respectively. Therein, the divided unit identifier 601 is used to identify the divided units included in the signal packet 600.

A signal packet 610 includes: a divided unit identifier 611; the divided unit 501 relevant to the mobile terminal 10; and the divided units 511 to 591, wherein 511 and 591 are relevant to the mobile terminals 11 and 19, respectively. In a similar manner, a signal packet 690 includes: a divided unit identifier 691; the divided unit 509 relevant to the mobile terminal 10; and the divided units 519 to 599, wherein 519 and 599 are relevant to the mobile terminals 11 and 19, respectively.

It is noted that the divided unit identifier 611 is used to identify the divided units included in the signal packet 610. The divided unit identifier 691 is also used to identify the divided units included in the signal packet 690.

Figure 8A:
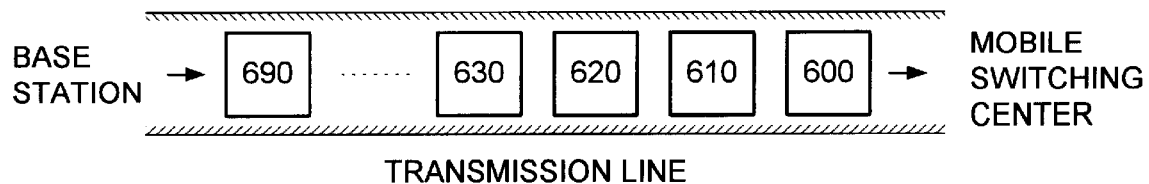
FIGS. 8(A), (B) and (C) are illustrations showing signal packets flowing in the transmission line.

The signal packets 600 to 690 configured in such a manner as described above are each transmitted at a separate time, from the base station to the mobile switching center via the transmission line, as shown in FIG. 8(A).

The mobile switching center receives the transmitted signal packets 600 to 690, processing them for each mobile terminal. With reference to FIG. 3 again, when receiving a signal packet, the distributor 400 distributes the divided units 500 to 599 for each of the mobile terminals included in the signal packets 600 to 690, to corresponding packet accumulation queues 410 to 41*j* (j=9). The packet accumulation queues 410 to 419 temporarily store the signal packets received from the distributor 400, outputting them to corresponding convolutional code decoders 420 to 42*j* (j=9). The convolutional code decoders 420 to 429 receive signal packets from corresponding packet accumulation queues 410 to 419, decoding them, respectively.

Next, a reproduction method for the signal codes involved in each divided unit, when a part of the signal packet is discarded or lost while a signal packet is transmitted from the base station to the mobile switching center via the transmission line, will be explained.

Figure 8B:
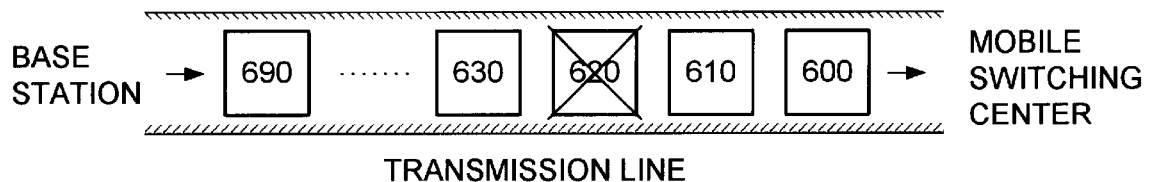
FIG. 8(B) is an illustration showing the case of loss of signal packet during the transmission.

Here, as shown in FIG. 8(B), they will be explained based upon the assumption that the signal packet 620 is discarded or not received by predetermined time period due to a congestion or other reasons occurring in the transmission line.

Figure 8C:
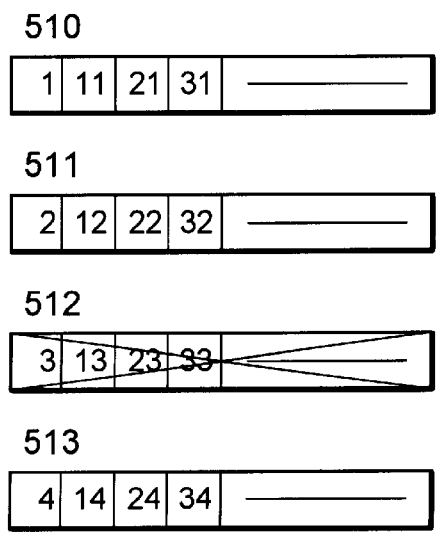
FIG. 8(C) is an illustration showing the state of loss of divided units caused by the loss of signal packet shown in FIG. 8(B).

Each divided unit relevant to the mobile terminal 11 and codes involved in it are both illustrated in FIG. 8(C).

Wherein, since the signal packet 620 is missing, it should be understood that the divided unit 512 and the codes involved in it are both missing in the divided units 510 to 519 relevant to the mobile terminal 11. The location of the signal codes involved in the divided units 510, 511, 513, 514, and 519 are replaced by a de-interleaving unit (not shown in figures ), in such a manner as shown in FIG. 9. By referring to FIG. 9, it should be understood that the codes 3 to 93 arranged in the vertical direction are missing in the codes relevant to the mobile terminal 11. However, the codes 2 to 92, and the codes 4 to 94, both arranged in the vertical direction, safely exist. Specifically, there exist the is codes encoded based upon the same information bit as in the codes 3 to 93. Therefore, in the step of decoding by the convolutional code decoder 421, original digital data is decoded and obtained.

Up to this point is the description of the changes in the forms of the signals transmitted from the base station to the mobile switching center (upward direction). It is apparent that the signal forms transmitted from the mobile switching center to the base station (downward direction) should also be understood with the configurations shown in FIGS. 2 and 3.

2. A Second Embodiment

Figure 10:
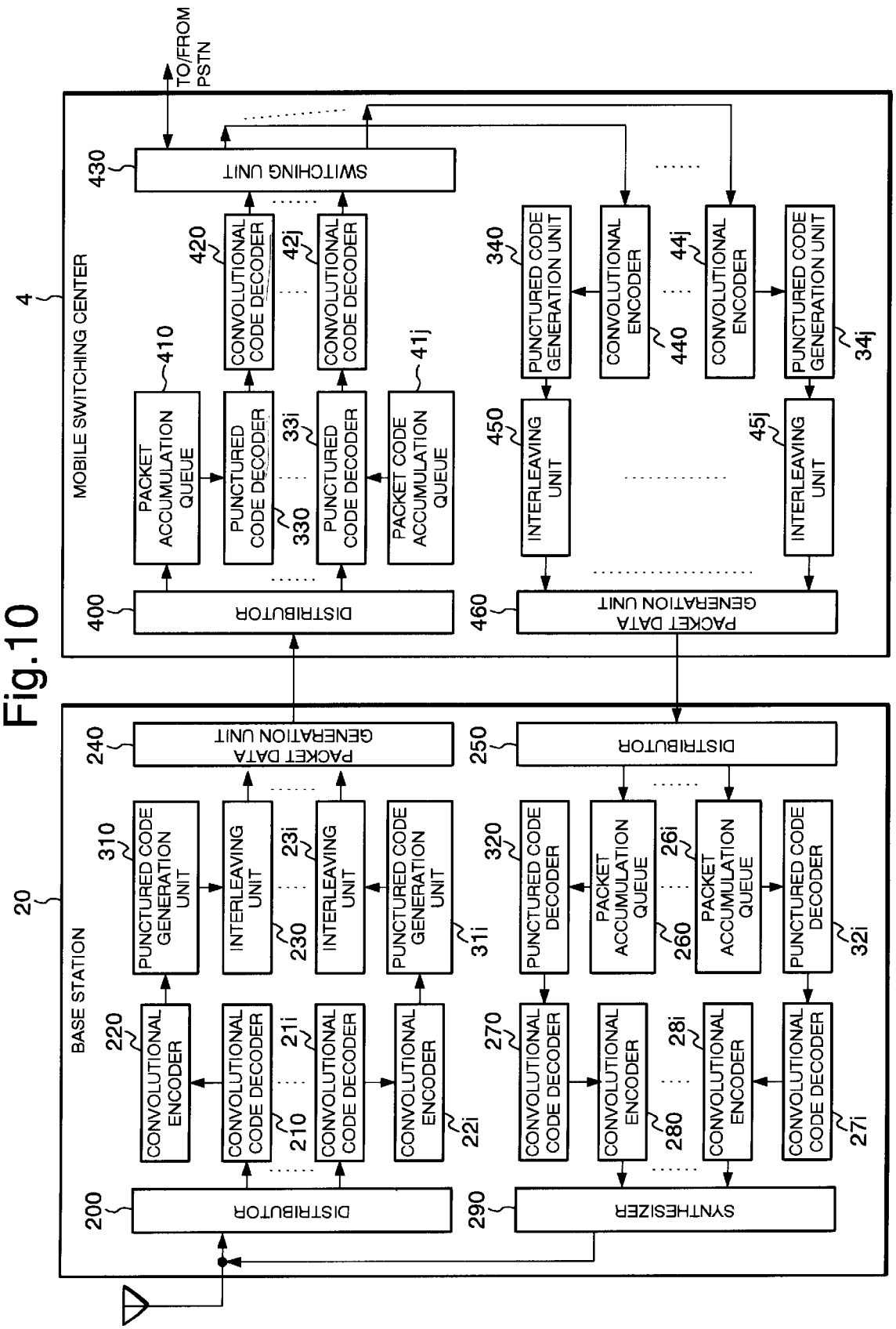
FIG. 10 is a block diagram showing the configuration of a base station and a mobile switching center of a second embodiment.

FIG. 10 is a block diagram showing the configuration of a base station and a mobile switching center of a second embodiment of the present invention.

As should be understood by referring to FIG. 10, the signal transmission system according to the second embodiment is a modification in that the configuration for punctured encoding and punctured decoding is added to the base station and the mobile switching center according to the aforementioned first embodiment.

The base station and the mobile switching center according to the second embodiment comprises punctured code generation unit 310 to 31*i* for punctured encoders in the base station, and also comprising punctured code decoders 330 to 33*j* for punctured decoders in the mobile switching center for upward signal direction. As for downward signal direction, punctured code generation unit 340 to 34*i* in the mobile switching center, and punctured code decoders 320 to 32*j* in the base station are provided.

More specifically, the base station according to the second embodiment, for upward signal direction, is comprised of a distributor 200, convolutional code decoders 210 to 21*i*, convolutional encoders 220 to 22*i*, punctured code generation units 310 to 31*i*, interleaving units 230 to 23*i*, and a packet data generation unit 240, as shown in FIG. 10.

On the other hand, the mobile switching center according to the second embodiment for upward signal direction, is comprised of a distributor 400, packet accumulation queues 410 to 41*j*, punctured code decoders 330 to 33*j*, and convolutional code decoders 420 to 42*j*.

According to the punctured encoding which can be performed with the above configuration, the number of generated code bits can be reduced.

Therefore, according to the second embodiment with the above configuration, the amount of information to be transmitted between the base station and the mobile switching center will be reduced which means probability of congestion of the transmission line will be reduced.

3. A Third Embodiment

Figure 11:
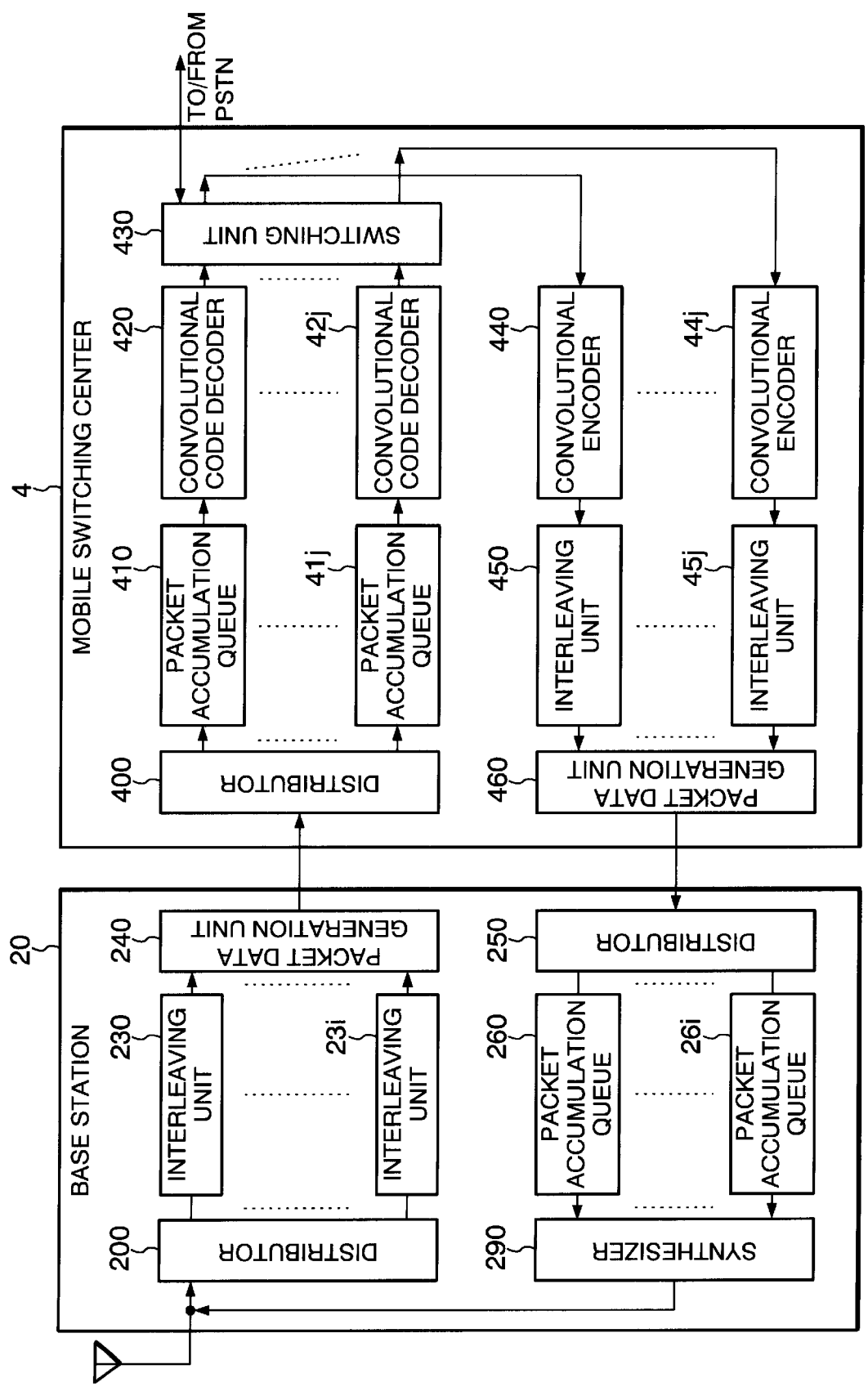
FIG. 11 is a block diagram showing the configuration of a base station and a mobile switching center of a third embodiment.

FIG. 11 is a block diagram showing the configuration of a base station and a mobile switching center of a third embodiment.

As should be understood by referring to FIG. 11, the third embodiment of the present invention is a modification where the convolutional code decoder and the convolutional encoder are both taken out from the above-mentioned first embodiment.

As for upward signal direction, the base station according to the third embodiment is comprised of a distributor 200, interleaving units 230 to 23$i$, and a packet data generation unit 240. On the other hand, the mobile switching center according to the third embodiment is comprised of a distributor 400, packet accumulation queues 410 to 41$j$, and convolutional code decoders 420 to 42$j$.

As for downward signal direction, the mobile switching center is comprised of convolutional encoders 440 to 44$j$, interleaving units 450 to 45$j$, and a packet data generation unit 460. On the other hand, the base station is comprised of a distributor 250, packet accumulation queues 260 to 26$j$, and synthesizer 290.

Wherein, the convolutional code decoders 420 to 42$j$ in the mobile switching center decode signals transmitted from corresponding mobile terminals, which have been encoded by the mobile terminals, respectively. It means that the base station does not have a procedure of decoding signals from the mobile terminals once and then encoding again for transmitting to the mobile switching center. Accordingly, signal packets from the base station received by the mobile switching center are configured whereby it includes the codes encoded by each mobile terminal. When the mobile switching center receives the packets, the convolutional code decoders 420 to 42$j$ decode them for each mobile terminal.

As for the opposite direction (downward direction), the principle is the same, the signals after switched by the switching unit 430 is convolutionaly encoded by the convolutional encoder 440–44$j$, and decoded at the mobile terminals.

In the above configuration, the structure of the base station will be simplified.

4. A Fourth Embodiment

Figure 12:
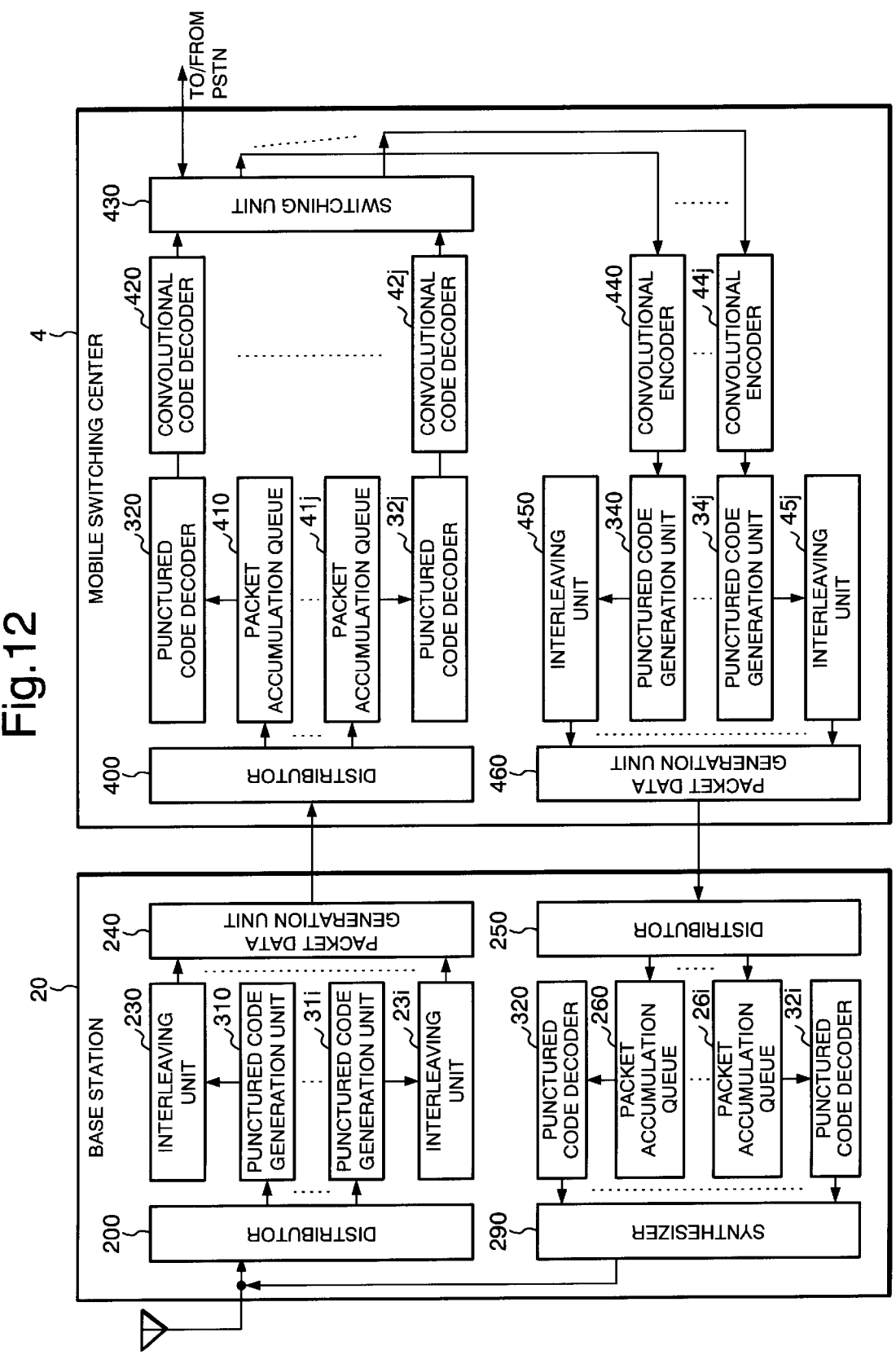
FIG. 12 is a block diagram showing the configuration of a base station and a mobile switching center of a fourth embodiment.

FIG. 12 is a block diagram showing the configuration of a base station and a mobile switching center of a fourth embodiment.

As should be understood by referring to FIG. 12, the fourth embodiment of the present invention is a modification configured by combining the above-mentioned second and third embodiments. That is to say, it is configured in such a way that the structure in the base station for convolutional code decoders are removed from the system of the above-mentioned first embodiment, and a structure for punctured encoding is added.

The base station according to the fourth embodiment is configured in such a way that the convolutional code decoders 210 to 21$i$, and the convolutional encoders 220 to 22$i$ are both removed from the base station shown in FIG. 2, and then punctured code generation units 310 to 31$i$ are added. That is to say, the base station according to the fourth embodiment is comprised of a distributor 200, punctured code generation units 310 to 31$i$, interleaving units 230 to 23$i$, and a packet data generation unit 240 as for upward signal direction.

On the other hand, the mobile switching center according to the fourth embodiment is comprised of a distributor 400, packet accumulation queues 410 to 41$j$, punctured code decoders 320 to 32$j$, and conventional code decoders 420 to 42$j$ as for upward signal direction.

As for downward signal direction, the mobile switching center according to the fourth embodiment is comprised of convolutional encoders 440–44$j$ for signals having been switched by the switching unit 430, punctured code generation units 340 to 34$j$, interleaving units 450 to 45$j$, and a packet data generation unit 460, and also, the base station according to the fourth embodiment is comprised of a distributor 250, packet accumulation queues 260 to 26$i$, punctured code decoders 320 to 32$i$, and a synthesizer 290.

In the forth embodiment with the above-mentioned configuration, the configuration has been simplified as compared to that of the second embodiment. At the same time, the amount of information transmitted through the transmission line is reduced.

5. A Fifth Embodiment

Figure 13:
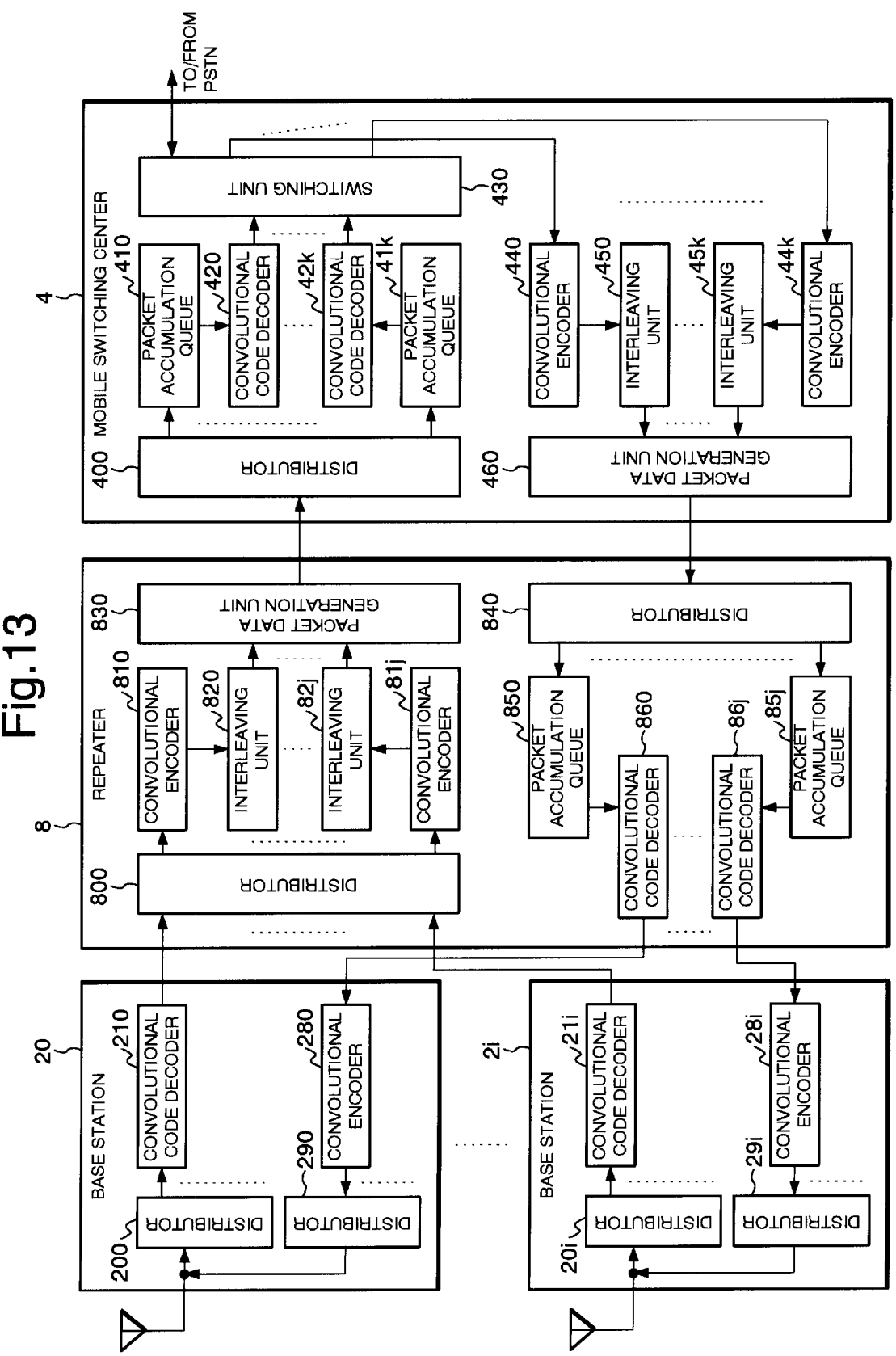
FIG. 13 is a block diagram showing the configuration of a base station, a repeater and a mobile switching center of a fifth embodiment.

FIG. 13 is a block diagram showing the configuration of a base station, a repeater and a mobile switching center of a fifth embodiment.

As should be understood by referring to FIG. 13, the fifth embodiment of the present invention is configured in such a way that a repeater 8 with a relaying function is connected between the base station and the mobile switching center.

The base station 20 comprises a distributor 200 and a convolutional code decoders 210 for upward signal direction, and a convolutional encoder 280 and a synthesizer 290 for downward signal direction. The distributor 200 distributes signals, received from the mobile terminal, to the convolutional code decoder 210. The convolutional code decoder 210 receives signals (signal codes) from the distributor 200, and decodes them into original digital data. The convolutional encoder 280 receives signals (digital data) from the repeater 8, and encodes them into signal codes and transmits them to the mobile terminal.

With the assistance of coding before signal transmission and decoding after signal reception, even though noises superimposed on the transmitted signal and a code error occurs at the radio transmission section between the mobile terminal and the base station, it can be corrected.

Digital data decoded by the convolutional code decoder 210 is transmitted to the repeater 8. The base station 2$i$ also transmits signals to the repeater 8 in the same manner as in the base station 20.

The repeater is comprised of a distributor 800, convolutional encoders 810–81$j$, interleaving units 820–82$j$, and a packet data generation unit 830 for upward signal transmission, and a distributor 840, packet accumulation queues 850–85$j$, and convolutional code decoders 860–86$j$ for downward signal transmission. The repeater 8 with the above-mentioned configuration is provided between a plurality of base stations and the mobile switching center, and signals from/to a plurality of base stations are transmitted to/from the mobile switching center through the repeater.

That is, when receiving a signal from one of base stations 20–2$i$, the distributor 800 distributes it to corresponding convolutional encoder 810–81$j$. To transmit a signal from the repeater 8 to the mobile switching center 4, the convolutional encoders 810–81$j$ convolutionaly encodes signals, and the interleaving units 820–82$j$ rearranges the order of the encoded codes obtained by the convolutional encoder. Thereby, the mobile switching center 4 can reproduce signals, even though a signal packet was discarded or lost due to occurrence of congestion in the transmission line. The packet data generation unit 830 generates signal packets including the codes received from interleaving units in the above-mentioned manner, transmitting it to the mobile switching center 4.

The mobile switching center 4 comprises a distributor 400, packet accumulation queues 410–41k, and convolutional code decoders 420 and 42k as for upward signal direction. It decodes data relevant to each mobile terminal and performs switching operation, in the same manner as in the mobile switching center according to the first embodiment. As for downward signal direction after switched by the switching unit 430, the mobile switching center 4 comprises convolutional encoders 440–44k, interleaving units 450–45k, and a packet generation unit 460.

Furthermore, it has been explained that the base station in the fifth embodiment decodes and the repeater encodes again. Alternatively, the base station may perform both of decoding and encoding, and transmitting encoded signal to the repeater. In this case, the repeater does not need to perform the above-mentioned encoding. Moreover, it is also accepted that the base station transmits to the repeater without decoding, accordingly the repeater decodes and then encodes again.

6. A Sixth Embodiment

Figure 14:
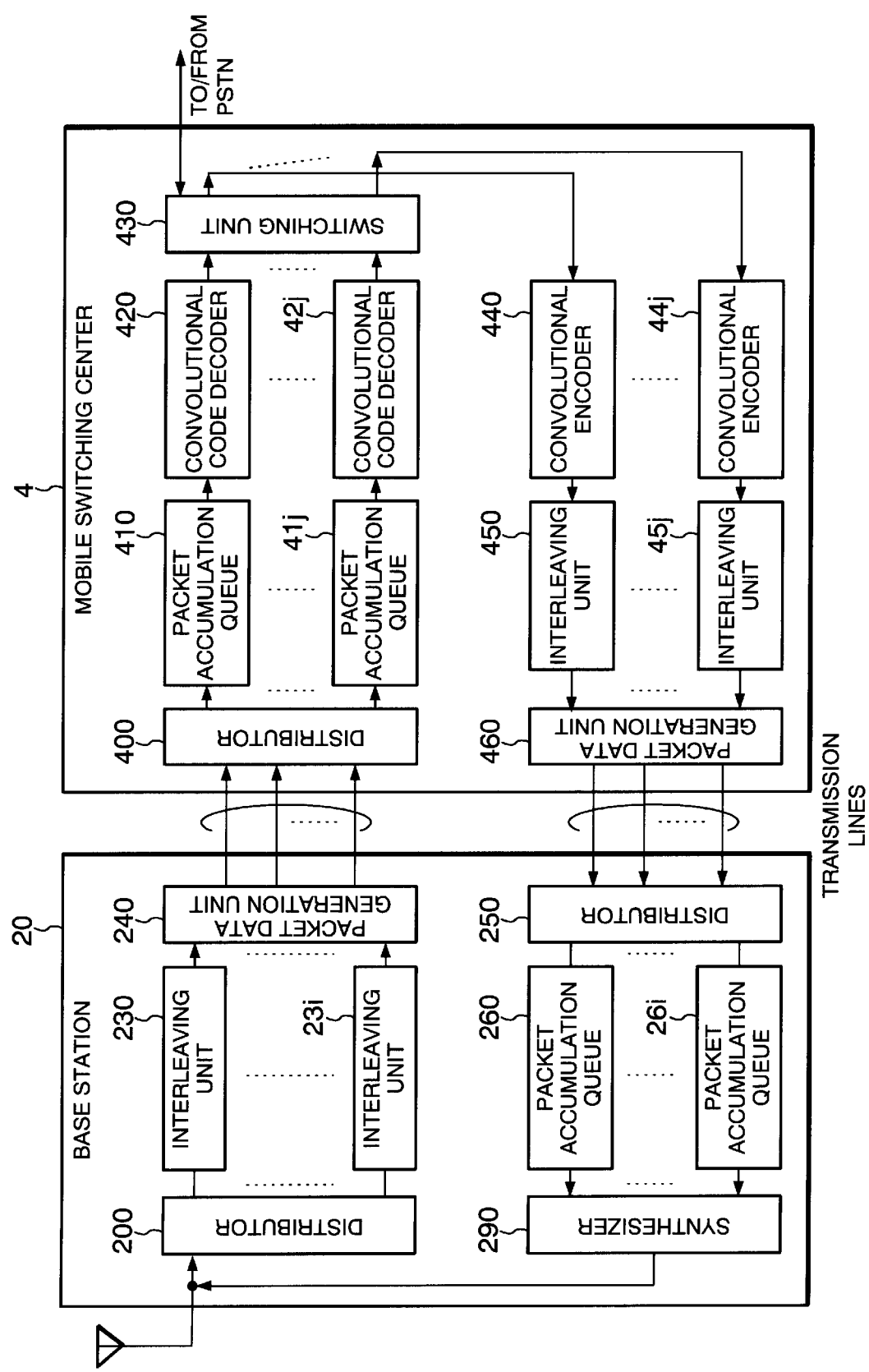
FIG. 14 is a block diagram showing the configuration of a base station and a mobile switching center of a sixth embodiment.
Figure 15:
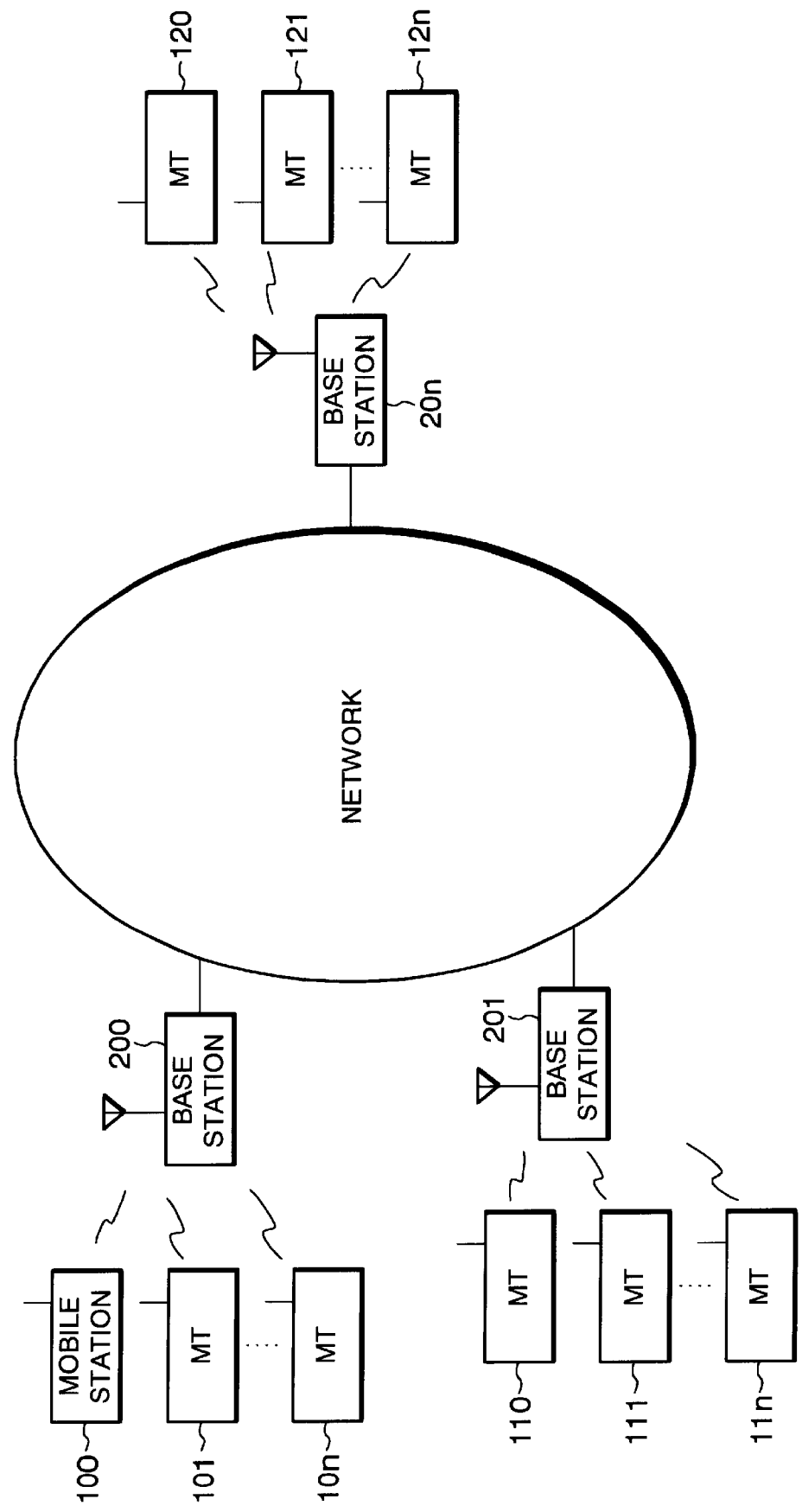
FIG. 15 is an illustration showing one example of the conventional technology.
Figure 16:
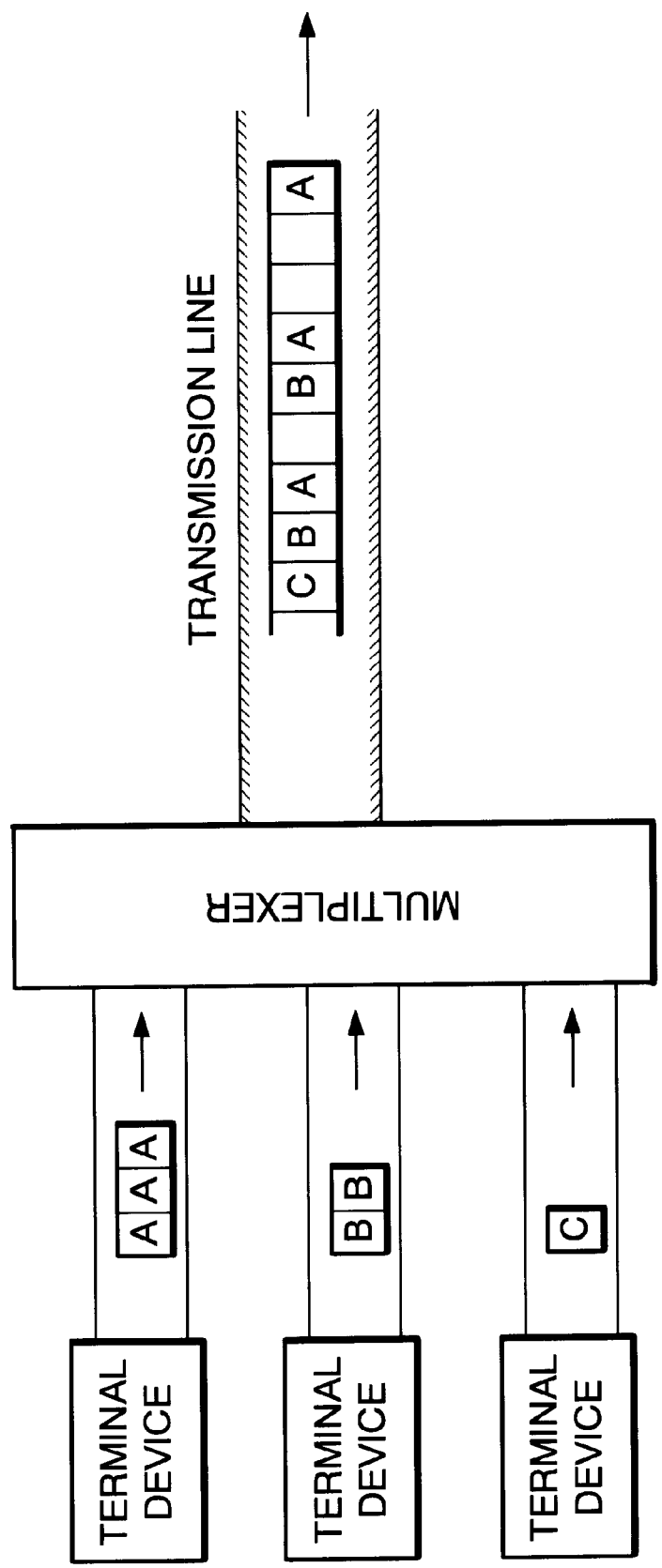
FIG. 16 is an illustration showing another example of the conventional technology.

FIG. 14 is a block diagram showing the configuration of a base station and a mobile switching center of a sixth embodiment.

As should be understood by referring to FIG. 14, the sixth embodiment of the present invention is configured in such a way that the base station is connected to a mobile switching center, via several transmission lines, in the third embodiment.

In the base station 20 according to the sixth embodiment, a distributor 200 and interleaving units 230–23i process in combination, in the same manner as in the aforementioned third embodiment. In addition, packet data generation unit 240 transmits signal packets to the transmission lines.

On the other hand, the mobile switching center 4 receives the signals transmitted via several transmission lines. A distributor 400, packet accumulation queues 410–41j, and convolutional code decoders 420–42j perform in combination in the same manner as in the third embodiment.

According to the embodiment with the above-mentioned configuration, signal packets can be transmitted to individual area transmission lines, respectively, so that the occurrence probability of signal packet loss can vary.

Furthermore, as to signals transmitted from the mobile switching center 4 to the base station 20, it is apparent that they can be realized based upon the similar idea to the one where the apparatus shown in FIG. 14.

As explained above, according to the present invention, data included in a transmission carrier such as a signal packet, which is transmitted between the base station and the mobile switching center, is given a redundancy. Therefore, for example, even though a part of a packet is lost, it can be reproduced with the assistance of another packet. Thus, according to the present invention, the transmission means between the base station and the mobile switching center is prepared based upon an intermittent transmission approach such as a packet transmission, the ATM cell transmission, or a frame relay transmission. Thereby, even if the packet is discarded or does not arrive within a predetermined time period, which may be caused by an occurrence of congestion along the transmission line, it can be guaranteed that continuity of signals transmitted from the mobile terminal or to be transmitted to the mobile terminal is maintained, and the signals can also be processed on a real-time basis.

Furthermore, according to the present invention, for a reason similar to the one mentioned above, a transmission is performed based upon the intermittent transmission approach used in a transmission means between the base station and the mobile switching center. Even though a packet or other related connections are lost during the transmission, it can be guaranteed that the quality of signals transmitted to/from the mobile terminal can be maintained. The number of possible signal transmissions can be decreased, accordingly.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A signal transmission system in a mobile communication network in which a base station is connected to a mobile switching center through a transmission line and a signal transmitted between the base station and the mobile switching center is a data packet, said signal transmission system comprising:

said base station including;
a plurality of convolutional encoders, each for convolutionaly encoding digital data from a mobile terminal to signal codes having redundant codes for correction;
a plurality of interleaving units, each for replacing a location of each signal code encoded by the corresponding convolutional encoder; and
a packet generation unit for generating data packets from signal codes output from each of said interleaving units for transmitting to said mobile switching center through said transmission line; and said mobile switching center including;
a plurality of convolutional code decoders, each for convolutionaly decoding signal codes transmitted from said base station, and reproducing signal codes corresponding to lost packets during transmission, and outputting original digital data for switching.

2. The signal transmission system in a mobile communication network according to claim 1, said mobile switching center and said base station further comprising:

said mobile switching center including;
a plurality of convolutional encoders, each for convolutionaly encoding digital data output from a switching unit to signal codes having redundant codes for correction;
a plurality of interleaving units, each for replacing a location of each signal code encoded by the corresponding convolutional encoder; and
a packet generation unit for generating data packets from signal codes output from each of said interleaving units for transmitting to said base station through said transmission line; and said base station including;
a plurality of convolutional code decoders, each for convolutionaly decoding signal codes transmitted from said mobile switching center, and reproducing signal codes corresponding to lost packets during transmission, and outputting original digital data for transmitting to the mobile terminal.

3. The signal transmission system in a mobile communication network according to claim 1, said base station further comprising a plurality of punctured code generation units, each for reducing a number of signal codes output from a corresponding convolutional encoder, and outputting said reduced number of signal codes to a corresponding interleaving unit, and said mobile switching center further comprising a plurality of punctured code decoders, each for restoring the reduced number of signal codes received from said base station to the original number of signal codes, and outputting said restored number of signal codes to a corresponding convolutional code decoder.

4. The signal transmission system in a mobile communication network according to claim 2, said mobile switching center further comprising a plurality of punctured code generation units, each for reducing a number of signal codes output from a corresponding convolutional encoder, and outputting said reduced number of signal codes to a corresponding interleaving unit, and said base station further comprising a plurality of punctured code decoders, each for restoring the reduced number of signal codes received from said mobile switching center to the original number of signal codes, and outputting said restored number of signal codes to a corresponding convolutional code decoder.

5. A signal transmission system in a mobile communication network in which a base station is connected to a mobile switching center through a transmission line and a signal transmitted between the base station and the mobile switching center is a data packet, said signal transmission system comprising:
   a plurality of mobile terminals, each including a convolutional encoder for convolutionaly encoding digital data to signal codes having redundant codes for correction;
   said base station including;
      a plurality of interleaving units, each for replacing a location of each signal code received from a corresponding mobile terminal; and
      a packet generation unit for generating data packets from signal codes output from each of said interleaving units for transmitting to said mobile switching center through said transmission line; and
   said mobile switching center including;
      a plurality of convolutional code decoders, each for convolutionaly decoding signal codes transmitted from said base station, and reproducing signal codes corresponding to lost packets during transmission, and outputting original digital data for switching.

6. The signal transmission system in a mobile communication network according to claim 5, said mobile switching center and said mobile terminal further comprising:
   said mobile switching center including;
      a plurality of convolutional encoders, each for convolutionaly encoding digital data output from a switching unit to signal codes having redundant codes for correction;
      a plurality of interleaving units, each for replacing a location of each signal code encoded by the corresponding convolutional encoder; and
      a packet generation unit for generating data packets from signal codes output from each of said interleaving units for transmitting to said base station through said transmission line; and
   said mobile terminal including a convolutional code decoder for convolutionaly decoding signal codes transmitted from said mobile switching center via said base station, and reproducing signal codes corresponding to lost packets during transmission, and outputting original digital data.

7. The signal transmission system in a mobile communication network according to claim 5, said base station further comprising a plurality of punctured code generation units, each for reducing a number of signal codes received from a corresponding mobile terminal, and outputting said reduced number of signal codes to a corresponding interleaving unit, and said mobile switching center further comprising a plurality of punctured code decoders, each for restoring the reduced number of signal codes received from said base station to the original number of signal codes, and outputting to said restored number of signal codes to a corresponding convolutional code decoder.

8. The signal transmission system in a mobile communication network according to claim 6, said mobile switching center further comprising a plurality of punctured code generation units, each for reducing a number of signal codes output from a corresponding convolutional encoder, and outputting said reduced number of signal codes to a corresponding interleaving unit, and said base station further comprising a plurality of punctured code decoders, each for restoring the reduced number of signal codes received from said mobile switching center to the original number of signal codes, and outputting to said restored number of signal codes to a corresponding mobile terminal.

9. A signal transmission system in a mobile communication network in which a base station is connected to a mobile switching center through a transmission line and a signal transmitted between the base station and the mobile switching center is a data packet, said signal transmission system comprising:
   a repeater connected between said base stations and said mobile switching center including;
      a plurality of convolutional encoders, each for convolutionaly encoding digital data from corresponding base station to signal codes having redundant codes for correction;
      a plurality of interleaving units, each for replacing a location of each signal code received from a corresponding convolutional encoder; and
      a packet generation unit for generating data packets from signal codes output from each of said interleaving units for transmitting to said mobile switching center through said transmission line; and
   said mobile switching center including;
      a plurality of convolutional code decoders, each for convolutionaly decoding signal codes transmitted from said repeater, and reproducing signal codes corresponding to lost packets during transmission, and outputting original digital data for switching.

10. The signal transmission system in a mobile communication network according to claim 9, said mobile switching center and said repeater further comprising:
   said mobile switching center including;
      a plurality of convolutional encoders, each for convolutionaly encoding digital data output from a switching unit to signal codes having redundant codes for correction;
      a plurality of interleaving units, each for replacing a location of each signal code encoded by the corresponding convolutional encoder; and
      a packet generation unit for generating data packets from signal codes output from each of said interleaving units for transmitting to said repeater through said transmission line; and
   said repeater including;
      a plurality of convolutional code decoders, each for convolutionaly decoding signal codes transmitted from said mobile switching center, and reproducing signal codes corresponding to lost packets during transmission, and outputting original digital data for transmitting to said base station.

11. The signal transmission system in a mobile communication network according to claim 5, wherein said base station and said mobile switching center are connected through a plurality of transmission lines.

12. The signal transmission system in a mobile communication network according to claim 6, wherein said base station and said mobile switching center are connected through a plurality of transmission lines.

13. A method of signal transmission in a mobile communication network in which a base station is connected to a mobile switching center through a transmission line and a signal transmitted between the base station and the mobile switching center is a data packet, said method comprising steps of:

from said base station,
convolutionaly encoding with a plurality of convolutional encoders digital data from a mobile terminal to signal codes having redundant codes for correction;
outputting signal codes with a plurality of interleaving units replacing a location of each signal code encoded by the corresponding convolutional encoder; and
generating data packets from the signal codes outputed from each of said interleaving units for transmitting to said mobile switching center through said transmission line; and from said mobile switching center including,
convolutionaly decoding with a plurality of convolutional code decoders signal codes transmitted from said base station;
reproducing signal codes corresponding to lost packets during transmission; and
outputting original digital data for switching.

14. The method of claim 13, comprising the further steps of:

at said mobile switching center including,
convolutionaly encoding with a plurality of convolutional encoders digital data output from a switching unit to signal codes having redundant codes for correction;
with a plurality of interleaving units, replacing a location of each signal code encoded by the corresponding convolutional encoder; and
generating data packets from signal codes output from each of said interleaving units for transmitting to said base station through said transmission line; and at said base station including,
convolutionaly decoding with a plurality of convolutional code decoders signal codes transmitted from said mobile switching center;
reproducing signal codes corresponding to lost packets during transmission; and
outputting original digital data for transmitting to the mobile terminal.

15. The method of claim 13, comprising the further steps of:

at the base station further,
using a plurality of punctured code generation units to reduce a number of signal codes output from a corresponding convolutional encoder; and
outputting said reduced number of signal codes to a corresponding interleaving unit; and at said mobile switching center,
for each of a plurality of punctured code decoders, restoring the reduced number of signal codes received from said base station to the original number of signal codes; and
outputting said restored number of signal codes to a corresponding convolutional code decoder.

16. The method of claim 14, further comprising the steps of:

at said mobile switching center,
reducing a number of signal codes output from convolutional encoders; and
outputting the reduced number of signal codes to interleaving units; and at said base station,
restoring the reduced number of signal codes received from said mobile switching center to the original number of signal codes; and
outputting said restored number of signal codes to convolutional code decoders.

17. A method of signal transmission system in a mobile communication network in which a base station is connected to a mobile switching center through a transmission line and a signal transmitted between the base station and the mobile switching center is a data packet, comprising the steps of:

providing a plurality of mobile terminals, each including a convolutional encoder for convolutionaly encoding digital data to signal codes having redundant codes for correction;

at said base station,
with a plurality of interleaving units, replacing a location of each signal code received from a corresponding mobile terminal; and
generating data packets from signal codes output from each of said interleaving units for transmitting to said mobile switching center through said transmission line; and at said mobile switching center,
using a plurality of convolutional code decoders, convolutionaly decoding signal codes transmitted from said base station, and reproducing signal codes corresponding to lost packets during transmission, and outputting original digital data for switching.

18. The method of claim 17, comprising the further steps of:

at said mobile switching center,
using each of a plurality of convolutional encoders to convolutionaly encoding digital data output from a switching unit to signal codes having redundant codes for correction;
with each of a plurality of interleaving units, replacing a location of each signal code encoded by the corresponding convolutional encoder; and
generating data packets from signal codes output from each of said interleaving units for transmitting to said base station through said transmission line; and at said mobile terminal,
convolutionaly decoding signal codes transmitted from said mobile switching center via said base station, and reproducing signal codes corresponding to last packets during transmission, and outputting original digital data.

19. The method of claim 17, comprising the further steps of:

at the base station,
using a plurality of punctured code generation units to each reduce a number of signal codes received from a corresponding mobile terminal, and outputting said reduced number of signal codes to a corresponding interleaving unit; and at said mobile switching center,
using a plurality of punctured code decoders, each restoring the reduced number of signal codes received from said base station to the original number of signal codes, and outputting to said restored number of signal codes to a corresponding convolutional code decoder.

20. The method of claim 18, comprising the further steps of:

at said mobile switching center,
with a plurality of punctured code generation units, reducing a number of signal codes output from a corresponding convolutional encoder, and outputting said reduced number of signal codes to a corresponding interleaving unit; and at said base station further,
using a plurality of punctured code decoders, each being used to restore the reduced number of signal codes received from said mobile switching center to the original number of signal codes, and outputting to said restored number of signal codes to a corresponding mobile terminal.

21. A method of signal transmission system in a mobile communication network in which a base station is connected to a mobile switching center through a transmission line and a signal transmitted between the base station and the mobile switching center is a data packet, comprising the steps of:

at said signal transmission system,
connecting a repeater between said base stations and said mobile switching center, the repeater including
a plurality of convolutional encoders, each for convolutionaly encoding digital data from corresponding base station to signal codes having redundant codes for correction;
a plurality of interleaving units, each for replacing a location of each signal code received from a corresponding convolutional encoder; and
a packet generation unit for generating data packets from signal codes output from each of said interleaving units for transmitting to said mobile switching center through said transmission line; and at said mobile switching center,
using a plurality of convolutional code decoders, each for convolutionaly decoding signal codes transmitted from said repeater, and reproducing signal codes corresponding to lost packets during transmission, and outputting original digital data for switching.

22. The method of claim 21, further comprising the steps of:

providing at said mobile switching center,
a plurality of convolutional encoders, each for convolutionaly encoding digital data output from a switching unit to signal codes having redundant codes for correction;
a plurality of interleaving units, each for replacing a location of each signal code encoded by the corresponding convolutional encoder; and
a packet generation unit for generating data packets from signal codes output from each of said interleaving units for transmitting to said repeater through said transmission line; and providing at said repeater including,
a plurality of convolutional code decoders, each for convolutionaly decoding signal codes transmitted from said mobile switching center, and reproducing signal codes corresponding to lost packets during transmission, and outputting original digital data for transmitting to said base station.

23. The method of claim 17, comprising the further step of connecting the base station and the mobile switching center through a plurality of transmission lines.

24. The method of claim 18, comprising the further step of connecting the base station and the mobile switching center through a plurality of transmission lines.

* * * * *